United States Patent [19]

Lacey

[11] Patent Number: 4,710,001

[45] Date of Patent: Dec. 1, 1987

[54] SUPPORT FOR A MOVING MIRROR IN AN INTERFEROMETER

[75] Inventor: Richard F. Lacey, Palo Alto, Calif.

[73] Assignee: Hewlett-Packard Company, Palo Alto, Calif.

[21] Appl. No.: 934,239

[22] Filed: Nov. 21, 1986

[51] Int. Cl.$^4$ ............................................. G02B 7/18
[52] U.S. Cl. ................................... 350/632; 350/639; 356/346
[58] Field of Search ............... 350/632, 639; 372/107; 356/346

[56] References Cited

U.S. PATENT DOCUMENTS 3,488,123  1/1970  Nichols ................................. 356/346
3,902,135  8/1975  Terada et al. ........................ 372/107
4,480,914  11/1984  Thompson et al. ................. 356/346

Primary Examiner—Jon W. Henry
Attorney, Agent, or Firm—Edward Y. Wong

[57] ABSTRACT

This invention supports a moving mirror in an interferometer, so that movement is restricted to a linear movement perpendicular to the plane of the mirror, and provides a means to impart a motion to the mirror. Two flat springs are connected at their centers with a beam. A mirror is affixed flush against the center portion of one of the springs, and a frame holds the edges of the springs fixed so that the beam and mirror can only move perpendicular to the plane of the springs and mirror. A voice coil is attached to the center of the other spring to impart motion to the beam and mirror.

7 Claims, 2 Drawing Figures

SUPPORT FOR A MOVING MIRROR IN AN INTERFEROMETER

FIELD OF THE INVENTION

This invention relates to an apparatus for supporting a moving mirror in an interferometer.

BACKGROUND OF THE INVENTION

In a Michelson interferometer, a moving mirror, moving in a linear motion perpendicular to the mirror's plane, is used to cause constructive and destructive interference between two beams derived from a common source. This function of the Michelson interferometer is used in Fourier transform infrared spectroscopy to uniquely identify gaseous molecules by their radiation absorption patterns. The moving mirror of the interferometer modulates the amplitudes of frequencies in a bandwidth of radiation. This resulting radiation is then used to irradiate the target gas to be analyzed. The power of the incident radiation upon the target gas is compared to that power after absorbtion by the gas to determine which frequencies are absorbed.

The moving mirror in the interferometer must be parallel to a fixed mirror in the interferometer to obtain a predictable interference pattern. The usual method of supporting the moving parallel mirror in a Michelson interferometer is with an air bearing. Air bearings are expensive, require the consumption of dry nitrogen, and permit a degree of wobble to the mirror. There are other methods which use "porch swing" flexures with pivots, but these too permit a degree of wobble.

The present invention permits substantially less tilt and wobble than the prior art, thus providing more accurate measurements using an interferometer.

SUMMARY OF THE INVENTION

The present invention is a means for supporting a mirror in an interferometer so that the mirror can move perpendicular to its plane without tilting or wobbling. In the preferred embodiment of the invention, a device uses two flat sheets of spring stock with angular slots milled in them to create two flat springs. The milled slots form a pattern of open-end rectangles. A rectangular beam is connected between the centers of the flat springs, and a mirror is affixed flush against the center of one of the flat springs opposite the beam. a supporting structure holds the edges of the flat springs fixed.

The flat springs are milled in such a way so that movement of the beam and mirror are restricted to movement perpendicular to the plane of the mirror without tilting or wobbling.

A voice coil can be connected to the beam to remotely control the movement of the beam and mirror, and a velocity transducer can be attached to the beam to measure the movement.

DETAILED DESCRIPTION OF THE INVENTION

Figure 1:
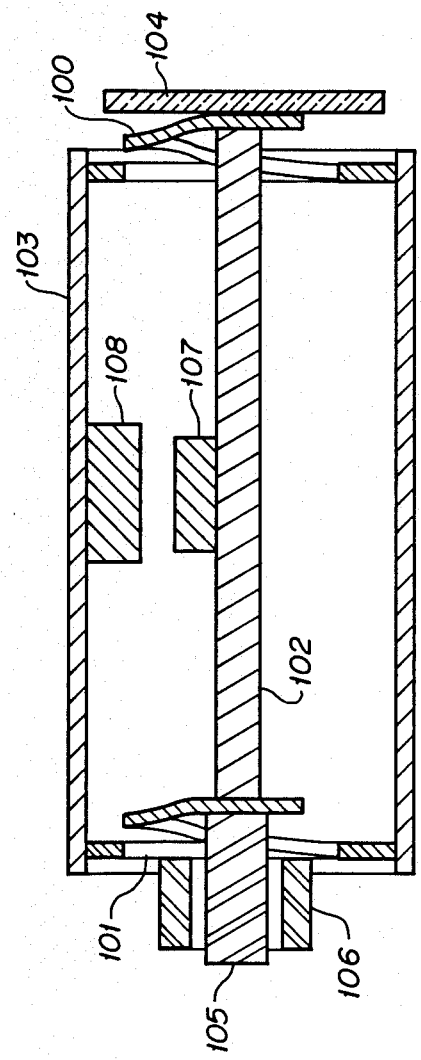
FIG. 1 shows the preferred embodiment of the invention.

As illustrated in FIG. 1, two flat sheets of spring stock having three open-ended slots milled in each of them form flat springs 100, 101. In the illustrated embodiment, the open-ended slots are milled as partial rectangles. Other forms of slots, for example, open-ended crescents and arcs, can be formed in place of rectangular slots.

Figure 2:
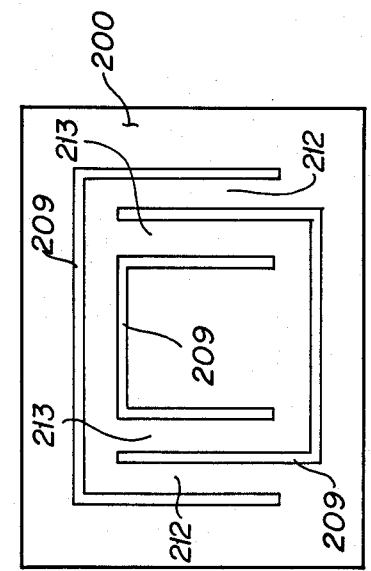
FIG. 2 shows one of the flat springs and the configuration of the slots milled in it.

FIG. 2 shows the detail of the rectangular slots 209 in the illustrated embodiment. Each open-ended rectangular slot 209 is inverted with respect to and partially enclosing the next innermost slot to form a symmetrical pattern about an axis. As a result, a flat spring whose center can move perpendicularly in and out of the plane of the flat spring with little pressure applied to it is created. The configuration of the slots 209 are such that, even when the spring is distended, the center section remains substantially parallel to the plane of the spring at equilibrium when it is arranged as described below.

In the illustrated embodiment in FIG. 1, two flat springs 100, 101 are connected by a hollow rectangular beam 102 at their centers 110, 111. A frame 103 holds the edges of the springs 100, 101 in place so that a displacement of the beam 102 will move the centers 110, 111 of both springs 100, 101 equally.

A mirror 104 is attached to the center 110 of one of the springs 100 so that the beam 102 and mirror 104 move identically. With this arrangement the beam 102 can be moved up to 2 mm without allowing perceptible tilting or wobbling of the mirror 104.

To remotely control movement of the mirror 104, a voice coil 105 is attached to the center 111 of the other flat spring 101. The voice coil 105 fits into a magnetic structure 106 so that a current through the voice coil 105 imparts movement to the beam 102 and mirror 104.

A velocity transducer or position transducer 107 can be placed inside the hollow rectangular beam 102, and a sensing coil 108 attached to the surrounding frame 103, in order to measure the displacement of the mirror 104.

The arrangement is designed to be as symmetric as possible. With vertical loads on both springs 100, 101 balanced, the net forces applied along the center of mass of the moving part of the system and net torques substantially cancel out to zero. As a result, the mirror 104 can be moved by the voice coil 105 without tilting or wobbling.

In the illustrated embodiment, the center of gravity of the central beam 102, voice coil 105 and mirror 105 lies on the axis of the voice coil 105 to avoid the generation of torque when the voice coil displaces the beam 102 and mirror 104 assembly. Furthermore, the length and width of the strips of spring stock 212 and 213 defined by the milled slots 209 are substantially equal so that torques produced by the springs 100 and 101 on the beam 102 when the mirror 104 is displaced from its equilibrium position will cancel themselves, resulting in substantially no net torque. In this manner, one potential source of wobble or tilt is greatly minimized.

I claim:

1. A supporting device for restricting movement to substantially one direction without tilting or wobbling, comprising:

a flat spring created by forming a plurality of openended slots in a flat sheet of spring stock, each slot partially enclosing the next innermost slot;

a frame for holding the edges of the flat spring in a fixed position; and a moving means for imparting movement to the center of the flat spring in a direction substantially perpendicular to the plane of the flat spring.

2. The supporting device as in claim 1, wherein the plurality of open-end slots formed are formed as open-ended rectangular slots.

3. The supporting device as in claim 2, wherein the plurality of rectangular slots formed in the flat spring forms a symmetrical pattern about an axis of the flat spring.

4. A device for supporting a moving mirror for use in an interferometer comprising:
   two flat springs created by forming a plurality of openended rectangular slots in two flat sheets of spring stock, each slot partially enclosing the next innermost slot;
   a beam connecting the centers of the two flat springs together;
   a frame for holding the edges of the flat springs in a fixed position;
   a moving mirror affixed flush against the center of one of the flat springs opposite the beam; and
   a moving means for imparting a movement to the beam and mirror perpendicular to the plane of the mirror.

5. The device in accordance with claim 4, wherein the moving means is a voice coil and magnetic assembly, where the voice coil is attached to the center of the flat spring not attached to the mirror, and the magnetic assembly is attached to the frame.

6. The device in accordance with claim 5, further comprising a means connected to the beam to determine the displacement of the mirror.

7. The device in accordance with claim 6, wherein the means to determine the displacement of the mirror is a velocity transducer where a magnet is attached to the beam and a sensing coil is attached to the surrounding frame.

* * * * *